(12) United States Patent  
Boyanich

(10) Patent No.: US 9,470,354 B2  
(45) Date of Patent: Oct. 18, 2016

(54) ADJUSTABLE SANITARY HOSE DONUT

(71) Applicant: John Robert Boyanich, American Canyon, CA (US)

(72) Inventor: John Robert Boyanich, American Canyon, CA (US)

( * ) Notice: Subject to any disclaimer, the term of this patent is extended or adjusted under 35 U.S.C. 154(b) by 0 days.

(21) Appl. No.: 14/810,440

(22) Filed: Jul. 27, 2015

(65) Prior Publication Data

US 2015/0330552 A1     Nov. 19, 2015

Related U.S. Application Data

(63) Continuation-in-part of application No. 14/035,896, filed on Sep. 24, 2013, now Pat. No. 9,175,800.

(60) Provisional application No. 61/705,182, filed on Sep. 25, 2012.

(51) Int. Cl.

| | |
|---|---|
| *F16L 3/00* | (2006.01) |
| *F16L 57/06* | (2006.01) |
| *F16L 3/133* | (2006.01) |
| *F16L 3/12* | (2006.01) |
| *F16L 3/10* | (2006.01) |
| *F16L 3/13* | (2006.01) |
| *E03C 1/06* | (2006.01) |

(52) U.S. Cl.
CPC ............. *F16L 57/06* (2013.01); *F16L 3/1066* (2013.01); *F16L 3/12* (2013.01); *F16L 3/13* (2013.01); *F16L 3/133* (2013.01); *E03C 1/06* (2013.01)

(58) Field of Classification Search
CPC ......... F16L 3/1215; F16L 3/12; F16L 57/00; F16L 57/06; E04C 5/203
USPC ........... 138/110, 112, 106; 248/218.4, 58.61, 248/62, 69, 74.3; 52/677, 678
See application file for complete search history.

(56) References Cited

U.S. PATENT DOCUMENTS

| | | | | |
|---|---|---|---|---|
| 3,694,989 A | * | 10/1972 | Oliver | E04C 5/203 52/678 |
| 3,913,187 A | * | 10/1975 | Okuda | F16L 3/1075 24/16 PB |
| 5,347,787 A | * | 9/1994 | Gavin | E04C 5/203 248/74.3 |
| 5,836,367 A | * | 11/1998 | Calabrese | F16L 3/1215 138/112 |
| 6,152,412 A | * | 11/2000 | Basickes | F16L 3/127 248/317 |
| 7,451,579 B2 | * | 11/2008 | Azarin | E04C 5/203 248/74.3 |
| 7,726,090 B2 | * | 6/2010 | Verelli | E04C 5/203 52/583.1 |
| 8,327,599 B2 | * | 12/2012 | Gavin | E04C 5/203 52/677 |
| 9,175,800 B2 | * | 11/2015 | Boyanich | F16L 57/06 |

* cited by examiner

*Primary Examiner* — Patrick F Brinson

(57) ABSTRACT

An adjustable sanitary hose donut has a variable inner diameter, which allows the adjustable sanitary hose donut to be used with multiple hoses having different diameters. The adjustable sanitary hose donut has an annular body and a fastener. The annular body has a plurality of sectors that are divided by a plurality of flex points. The plurality of flex points allows the plurality of sectors to bend inwards or outwards from one another in order to adjust the inner diameter of the annular body. A first overlapping section and a second overlapping section of the annular body also aid in allowing the inner diameter of the annular body to expand or contract. The fastener is positioned through both the first overlapping section and the second overlapping section and is used to lock the annular body at the desired inner diameter.

13 Claims, 17 Drawing Sheets

ADJUSTABLE SANITARY HOSE DONUT

The current application is a continuation-in-part of application Ser. No. 14/035,896, filed Sep. 24, 2013, which claims the benefit of U.S. Provisional Patent application Ser. No. 61/705,182 filed on Sep. 25, 2012.

FIELD OF THE INVENTION

The present invention relates generally to a hose collar. More specifically, the present invention is a hose donut having a variable inner diameter. Furthermore, the present invention can function as a pipe hanger.

BACKGROUND OF THE INVENTION

Processing plants around the country use hoses to pump fluids and other products from one area to another. Many of these processing plants utilize hose collars, which are attached around the exterior of the hose. These hose collars serve a number of purposes and are often made out of rubber or plastic material. One function of hose collars is to protect the exterior of the hose, as hoses are often dragged across the ground. Another function of hose collars is to protect the hose fittings from being damaged, as the hose fittings are costly. A third function provided by hose collars is to raise the entire hose off of the ground in order to protect the hose from any contaminants.

While current hose collars are able to provide the benefits described above, the problem remains that not all hoses have the same outer diameter. Even the same hose may have outer diameter tolerance variations along its length, resulting in a hose collar fitting tight around one end, while fitting loose around the opposing end. Making a hose collar that fits various hose outer diameters properly and tightly has always been extremely difficult. While a hose collar could be made to fit each and every individual hose, it would not be practical as it would require a multitude of hose collar sizes to satisfy every need. Another problem with current hose collars is that many cannot be installed in the field or require the hose fitting to first be removed. The best solution has always been to have an adjustable hose collar that can be easily attached to or removed from a hose while in the field.

Therefore it is the object of the present invention to provide a hose collar having a variable inner diameter, such that the hose collar can be fitted around a multitude of hoses having different outer diameters. The present invention provides a circular one piece body having a plurality of flex points. The plurality of flex points allows the one piece body to be opened or closed in order to adjust the inner diameter of the one piece body. A fastener is used to secure the one piece body at the desired diameter once the hose collar has been fitted around a hose. In addition to providing the functions of a hose collar, the present invention can also be designed to function as an adjustable pipe hanger.

DETAIL DESCRIPTIONS OF THE INVENTION

All illustrations of the drawings are for the purpose of describing selected versions of the present invention and are not intended to limit the scope of the present invention.

The present invention is an adjustable sanitary hose donut that can be used with multiple hoses having different outer diameters. In the preferred embodiment of the present invention, the adjustable sanitary hose donut is designed to have a minimum variable inner diameter of half an inch, however, the adjustable sanitary hose donut may be designed to have any other inner diameter tolerance. The adjustable sanitary hose donut elevates the hose to which the adjustable sanitary hose donut is attached and aids in protecting the hose fitting and the hose exterior from being damaged.

Figure 1:
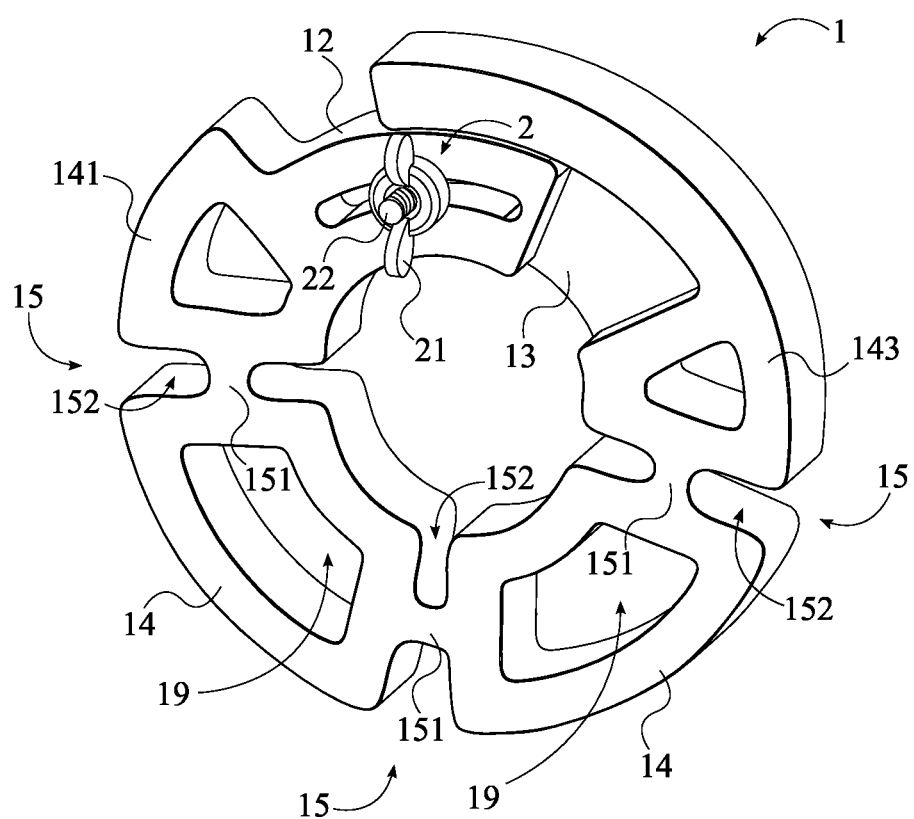
FIG. 1 is a front perspective view of the present invention in a closed position.

In reference to FIG. 1, the adjustable sanitary hose donut comprises an annular body 1 and a fastener 2. The annular body 1 is a single piece that forms a ring that can be opened along one section. Ideally the annular body 1 is created through injection molding, although it is possible for any other known manufacturing process to be used. The fastener 2 is used to couple the two open ends of the annular body 1 together in order to retain the desired inner diameter if the adjustable sanitary hose donut. In the preferred embodiment of the present invention, the annular body 1 is constructed from a polyurethane or nylon material and the fastener 2 is constructed from stainless steel, however, it is possible for any number of other materials to be used in the construction of the annular body 1 or the fastener 2.

Figure 2A:
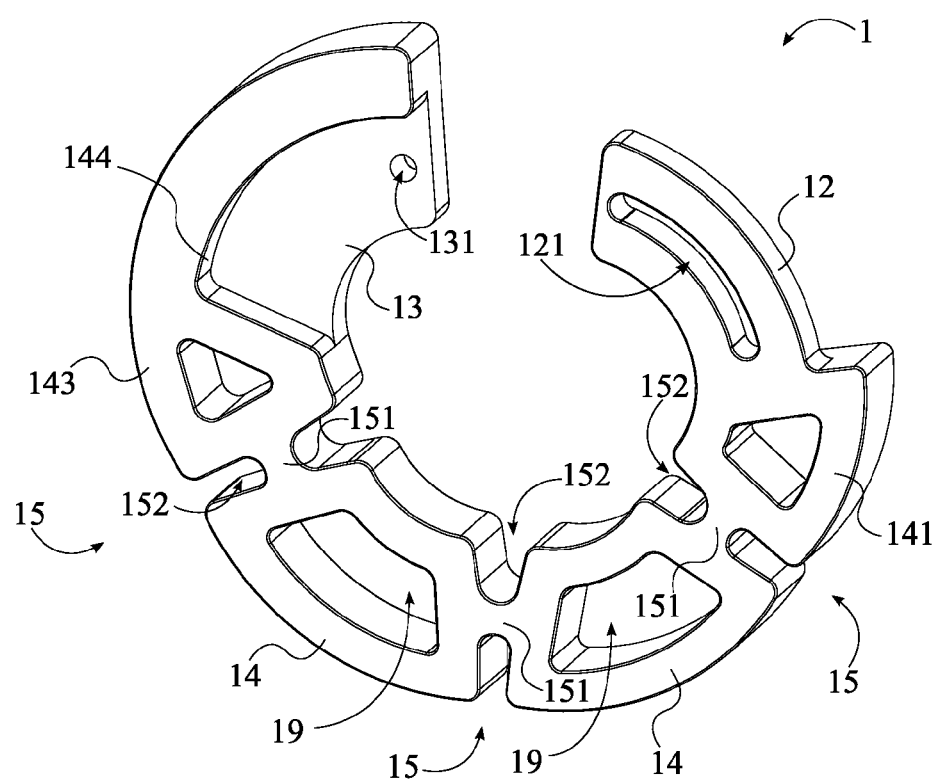
FIG. 2A is a front perspective view of the present invention is an open position.
Figure 2B:
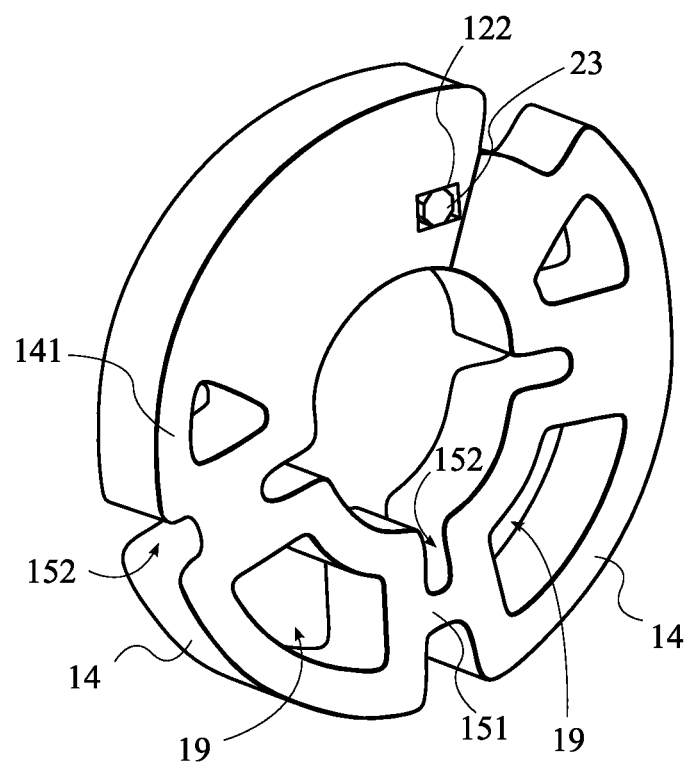
FIG. 2B is a rear perspective view of the present invention in a closed position.
Figure 2C:
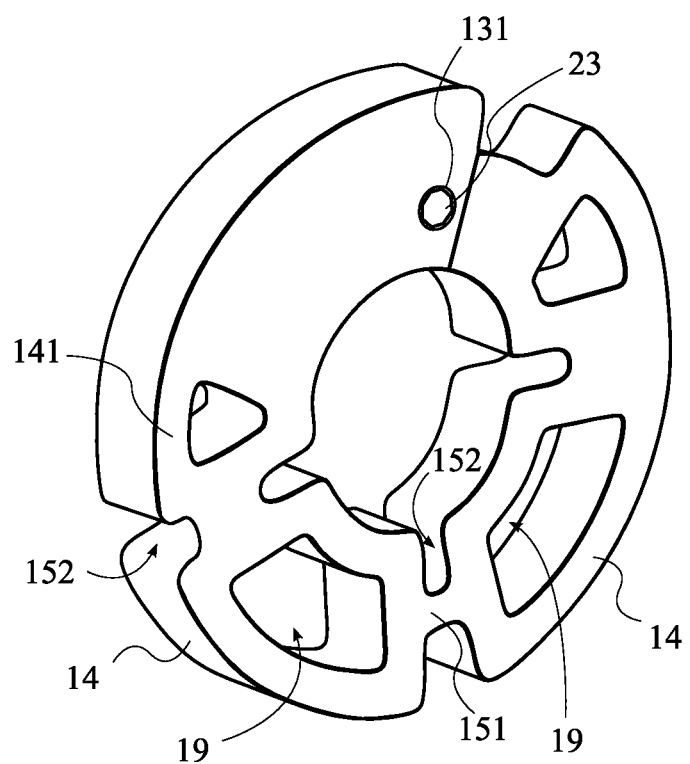
FIG. 2C is a rear perspective view of the present invention in a closed position according to an alternative embodiment.
Figure 2D:
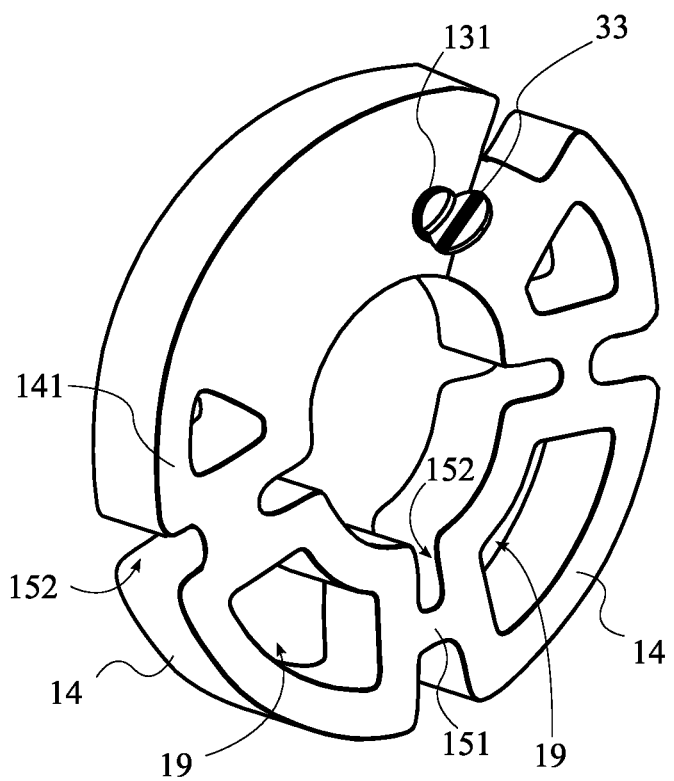
FIG. 2D is a rear perspective view of the present invention in a closed position according to another alternative embodiment.
Figure 3:
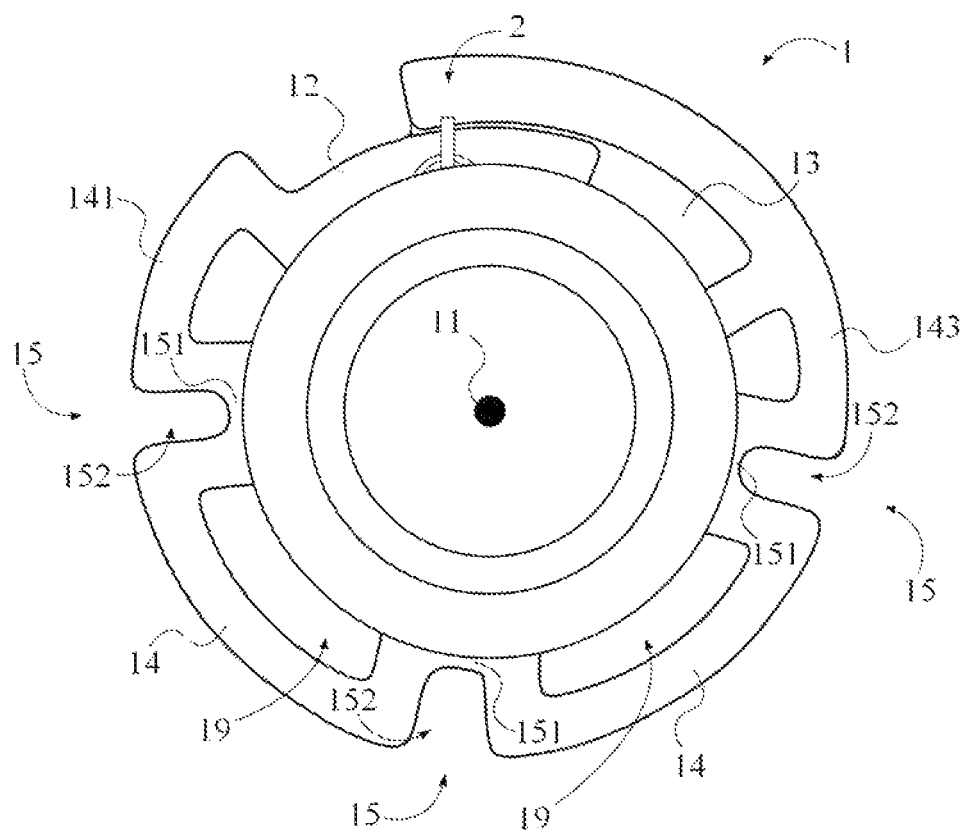
FIG. 3 is a front elevational view of the adjustable sanitary hose donut attached to a hose.
Figure 4:
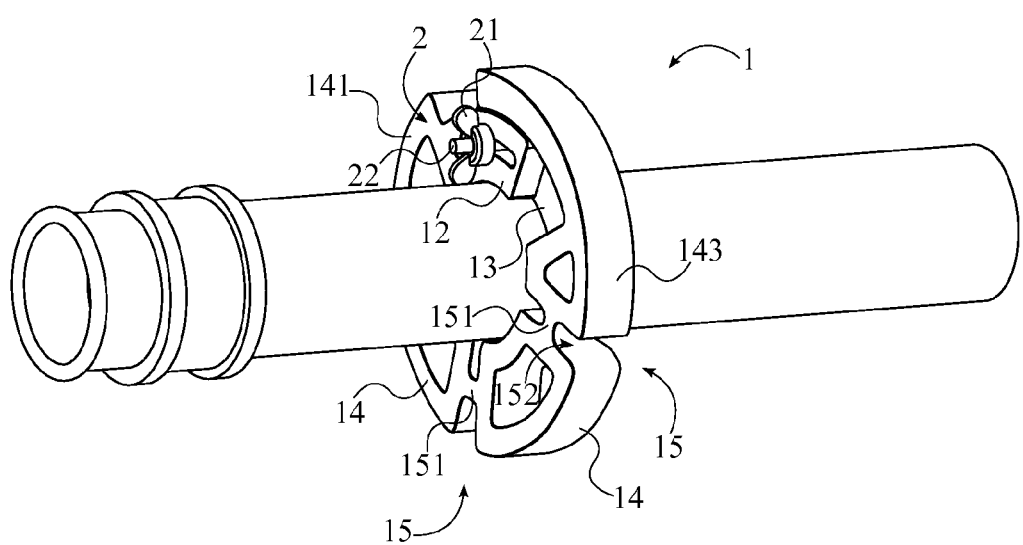
FIG. 4 is a perspective view of the adjustable sanitary hose donut attached to a hose.

In reference to FIG. 2A-3, the annular body 1 comprises a center point 11, a first overlapping section 12, a second overlapping section 13, a plurality of sectors 14, and a plurality of flex points 15. The center point 11 serves as a reference point for which the plurality of sectors 14 and the plurality of flex points 15 are radially positioned around. The center point 11 is coincident with the central axis of a hose, when the adjustable sanitary hose donut is attached to the hose. The plurality of flex points 15 and the plurality of sectors 14 are alternated in position around the center point 11. Each of the plurality of flex points 15 comprises an elastic portion 151 and at least one open space 152. The elastic portion 151 of each of the plurality of flex points 15 is connected to the plurality of sectors 14 and serves as a flexible joint between two adjacent sectors. The at least one open space 152 is positioned adjacent to the elastic portion 151, thus providing the necessary empty space into which the plurality of sectors 14 can be bent. The plurality of sectors 14 are curved rigid sections of the annular body 1, while the plurality of flex points 15 allows each of the plurality of sectors 14 to be bent towards or away from each other to aid in the adjustment and keep a true circle thru a range of varying inner diameters of the annular body 1. The sectors 14 form grip openings 19, of the annular body 1 which are convenient handles for lifting the hose. In a preferred embodiment, the number of sectors 14 is two.

The annular body 1 comprises a first portion 141, a second portion 143, and a ledge 144. The first overlapping section 12 is adjacently connected to the first portion 141, while the second overlapping section 13 is adjacently connected to the second portion 143. The first overlapping section 12 and the second overlapping section 13 can be separated from one another in order to create an open section in the annular body 1 through which a hose can be laterally positioned into the adjustable sanitary hose donut. The ledge 144 serves to guide the first overlapping section 12 as it slides past the second overlapping section 13.

The first overlapping section 12 and the second overlapping section 13 are positioned such that they slidably engage one another along one side. The positioning of the first overlapping section 12 can be adjusted in relation to the second overlapping section 13 in order to vary the inner diameter of the annular body 1. The first overlapping section 12 comprises a size adjustment slot 121, while the second overlapping section 13 comprises a fastener hole 131. The size adjustment slot 121 traverses through the first overlapping section 12 and is radially positioned along the first overlapping section 12. The fastener hole 131 traverses through the second overlapping section 13 and is positioned along the second overlapping section 13 opposite the second portion 143.

When the first overlapping section 12 and the second overlapping section 13 are in the desired position, the fastener 2 is tightened in order to attach the first overlapping section 12 to the second overlapping section 13.

In one embodiment, the fastener hole 131 is a single hole that is aligned with the size adjustment slot 121. The size adjustment slot 121 is an elongated slit, such that as the position of the first overlapping section 12 is adjusted in relation to the second overlapping section 13, the fastener hole 131 and the size adjustment slot 121 remain aligned.

The fastener 2 is used to couple the first overlapping section 12 to the second overlapping section 13 and comprises a nut 21 and a bolt 22. When the fastener 2 is in use, the bolt 22 traverses through both the fastener hole 131 and the size adjustment slot 121. In some embodiments, a head 23 of the bolt 22 optionally rests within an indent 122 surrounding the fastener hole 131, such that the head 23 of the bolt 22 rests flush with the outer surface of the second overlapping section 13 (as shown in FIG. 2B). In an alternative embodiment of the present invention, the indent 122 is omitted, as shown in FIG. 2C. The indent 122 also acts to hold the bolt 22 in a fixed position so that the nut 21 can be tightened when the nut 21 is threadably engaged to the bolt 22. In one embodiment, the nut 21 is a wing nut 21, which allows the fastener 2 to more readily be tightened by a user without the use of additional tools. It is also possible for the fastener 2 to be any other device capable of clamping the first overlapping section 12 and second overlapping section 13 together in a fixed position.

Referring to FIG. 2D, an alternative embodiment is shown in which the bolt 22 is replaced by a thumb screw bolt 33. In this configuration, the wing nut 21 and thumb screw bolt 33 are screwed together to enable the user to fasten the first and second overlapping sections 12, 13 without the use of tools.

Figure 5:
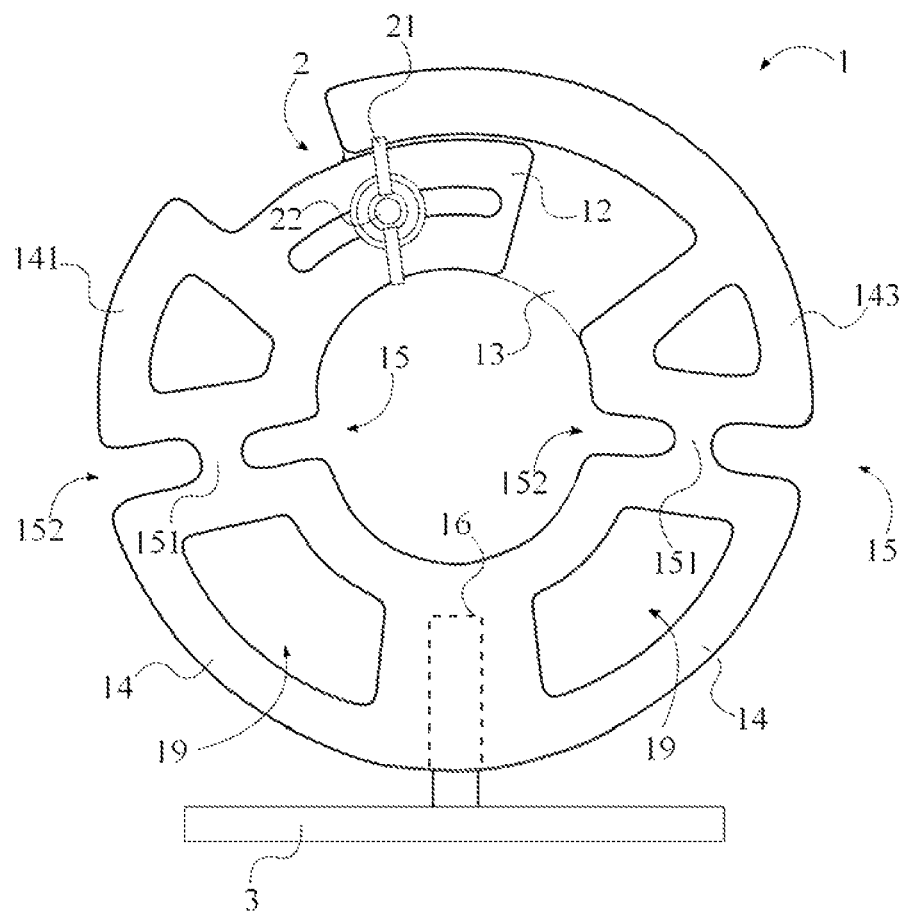
FIG. 5 is a front elevational view of the present invention adapted as a hose/pipe hanger.

In reference to FIG. 5, the adjustable sanitary hose donut can also be adapted to function as a pipe hanger. In such an instance, the adjustable sanitary hose donut further comprises a hanger 3 and the annular body 1 further comprises a hanger receiver 16. The hanger 3 is positioned into the hanger receiver 16 and is in that way attached to the plurality of sectors 14. The hanger receiver 16 is a threaded hole that laterally traverses into plurality of sectors 14, while the hanger 3 consists of a flat plate concentrically connected to a threaded rod. The threaded rod is screwed into the hanger receiver 16 and the flat plate is then welded onto another surface, such as the ceiling or wall, thus allowing a pipe or hose to be supported along said surface. It is also possible for the hanger 3 to be any other device that allows the annular body 1 to be mounted to a surface or other fixture, such as a hook, loop, etc.

Figure 6:
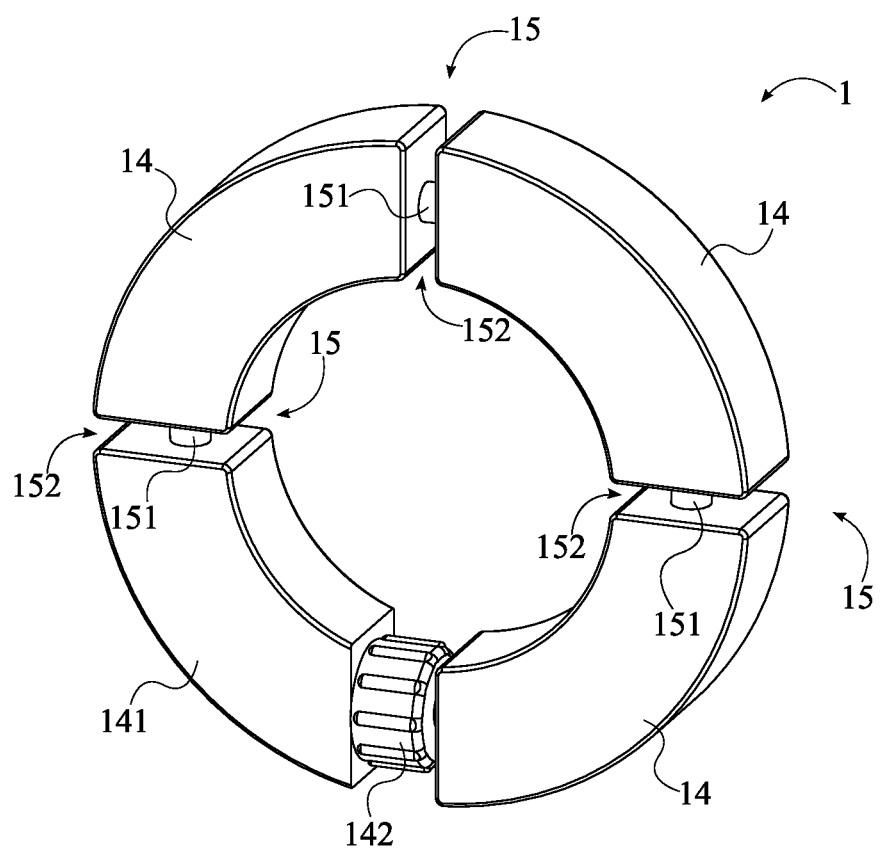
FIG. 6 is a perspective view of an alternative embodiment of the present invention, with the plurality of sectors being connected by a flexible strap.
Figure 7:
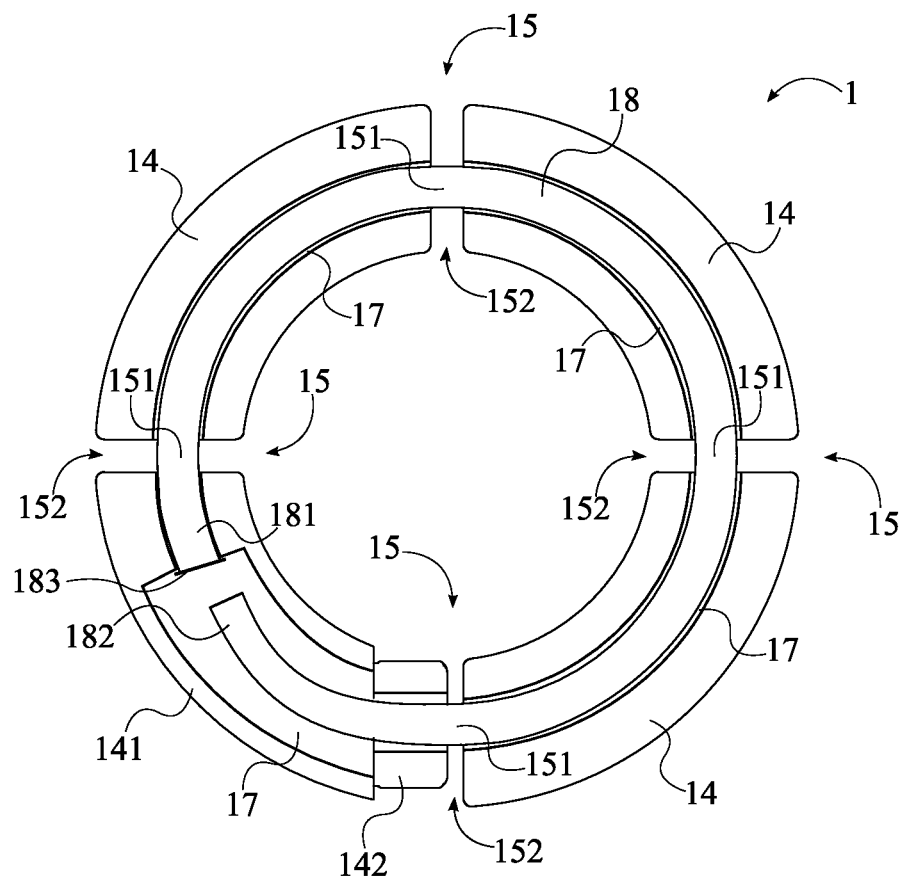
FIG. 7 is a front elevational sectional view of the adjustable sanitary hose donut in the alternative embodiment depicted in FIG. 6.

In reference to FIG. 6-7, in an alternative embodiment of the present invention, the adjustable sanitary hose donut comprises only the annular body 1. The annular body 1 further comprises an annular channel 17 and a flexible strap 18. The annular channel 17 traverses through each of the plurality of sectors 14, with the flexible strap 18 being positioned within the annular channel 17. Each of the plurality of sectors 14 is separate from one another, with the portion of the flexible strap 18 running in between each of the plurality of sectors 14 serving as the elastic portion 151. The plurality of sectors 14 has a first portion 141 to which the flexible strap 18 is secured. The first portion 141 comprises a clamp 142 with which the length of the flexible strap 18 can be adjusted. The flexible strap 18 comprises a first end 181 and a second end 182 being positioned opposite of each other along the flexible strap 18. The first end 181 is connected to the first portion 141 within the receiving channel, providing an anchor point for the flexible strap 18. The clamp 142 is positioned opposite the first end 181 along the first portion 141. The flexible strap 18 traverses through the plurality of sectors 14 and then traverses through the clamp 142 into the annular channel 17 in the first portion 141. When the desired length of the flexible strap 18 has been inserted through the clamp 142 into the annular channel 17 in the first portion 141, the clamp 142 is tightened in order to hold the second end 182 of the flexible strap 18 in place. The sectors 14 are adapted to slide along the flexible strap 18 to accommodate a variety of inner diameters of the annular body. The clamp 142 can be any type of device used to securely hold the flexible strap 18 in place. For example, the clamp 142 could be a compression valve. The clamp 142 may be attached to the first portion 141 by any suitable means. For example, the clamp 142 may be attached to the first portion 141 by threads.

Figure 8:
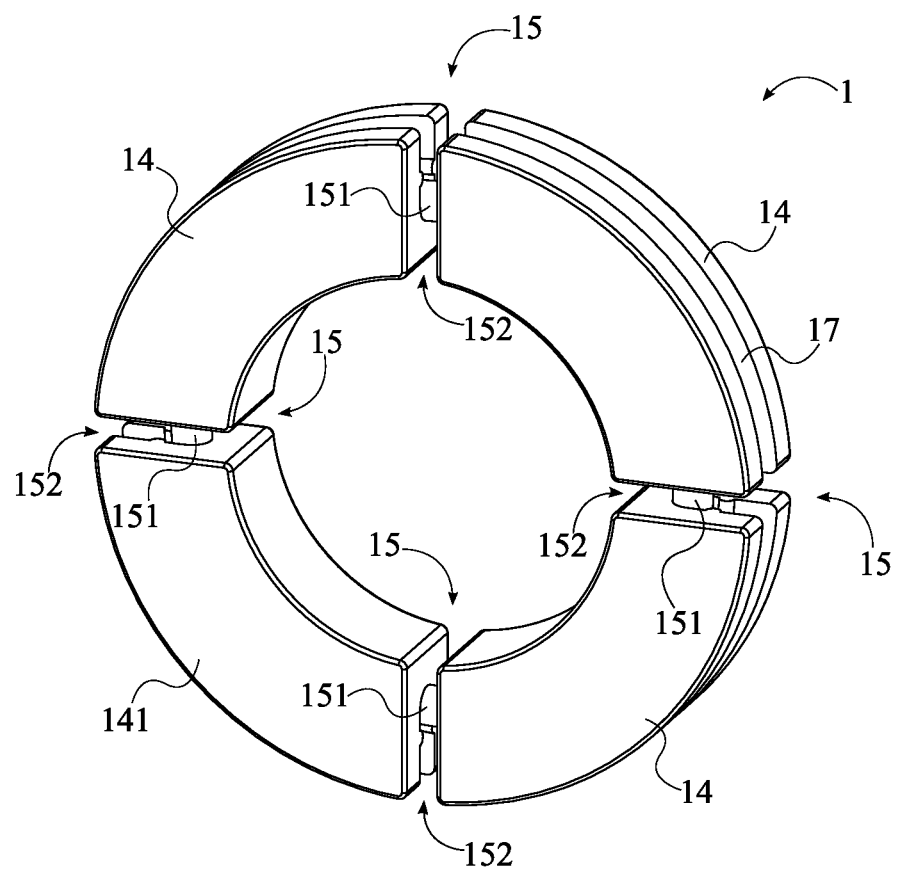
FIG. 8 is a perspective view of another alternative embodiment of the present invention, with the plurality of sectors being connected by an elastic strap.
Figure 9:
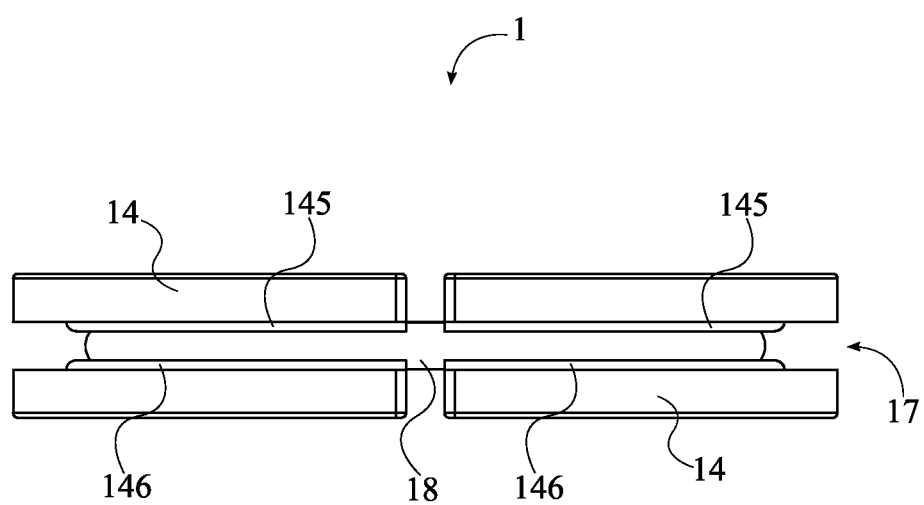
FIG. 9 is a top plan view of the adjustable sanitary hose donut in the alternative embodiment depicted in FIG. 8.

In reference to FIG. 8-9, in another alternative embodiment of the present invention, the annular body 1 again comprises the annular channel 17 and the flexible strap 18, with the flexible strap 18 being elastic. The annular channel 17 laterally traverses into the plurality of sectors 14, such that flexible strap 18 is visible around the perimeter of the annular body 1, when the flexible strap 18 is positioned within the annular channel 17. Each of the plurality of sectors 14 comprises a first flange 145 and a second flange 146. The first flange 145 and the second flange 146 are positioned opposite of each other within the annular channel 17. In this way, the flexible strap 18 can be snapped in and out of place within the annular channel 17, while the first flange 145 and the second flange 146 act to retain the position of the flexible strap 18 when the flexible strap 18 is in place within the annular channel 17.

Figure 10:
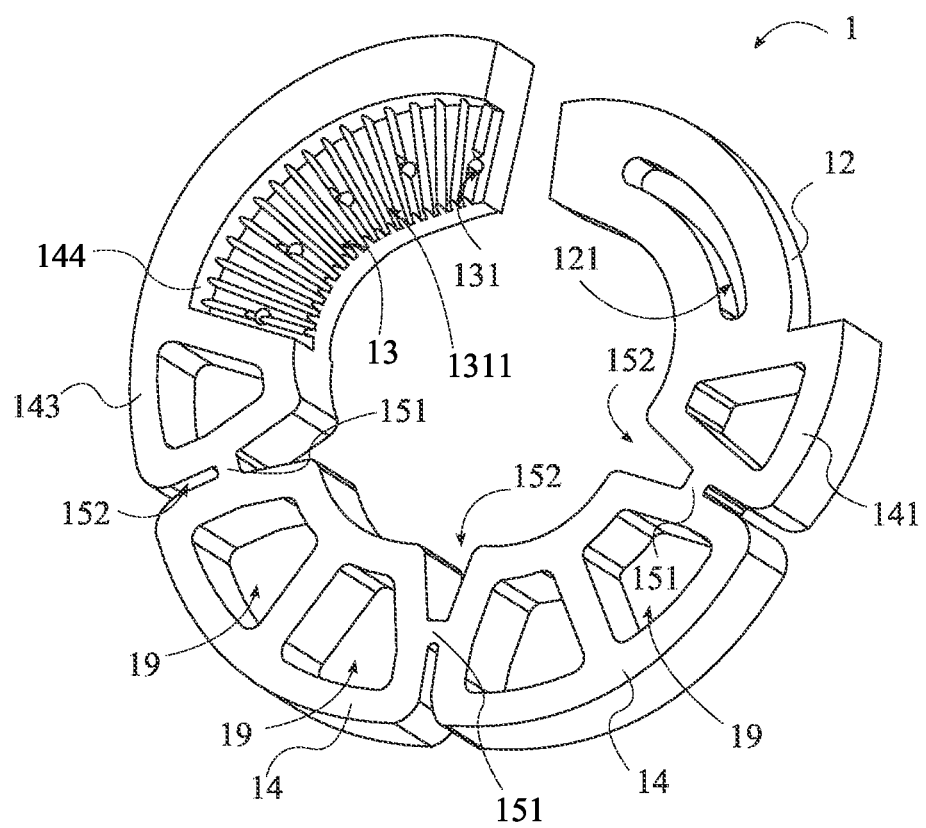
FIG. 10 is a front perspective view of another alterative embodiment of the present invention in an open position.
Figure 11:
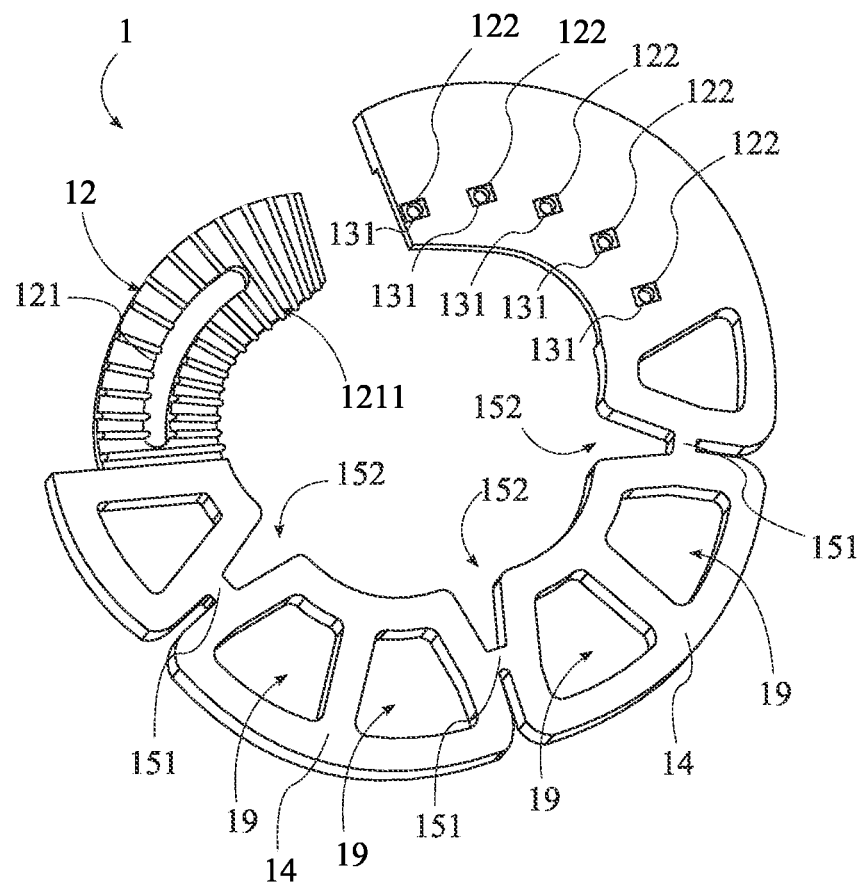
FIG. 11 is a rear perspective view in an open position in the alternative embodiment depicted in FIG. 10.

In the embodiment of FIG. 10-11, an alternate fastening mechanism is provided. A plurality of fastener holes 131 are arcuately arranged on the second overlapping section 13 to allow two bolts 22 and two nuts 21 to secure the first and second overlapping sections 12, 13. Having two bolts 22 and two nuts 21 prevents twisting of the first and second overlapping sections 12, 13. In addition, the first overlapping section 12 comprises a first set of radially oriented ribs 1211. Similarly, the second overlapping section 13 comprises a second set of radially oriented ribs 1311.

Figure 13:
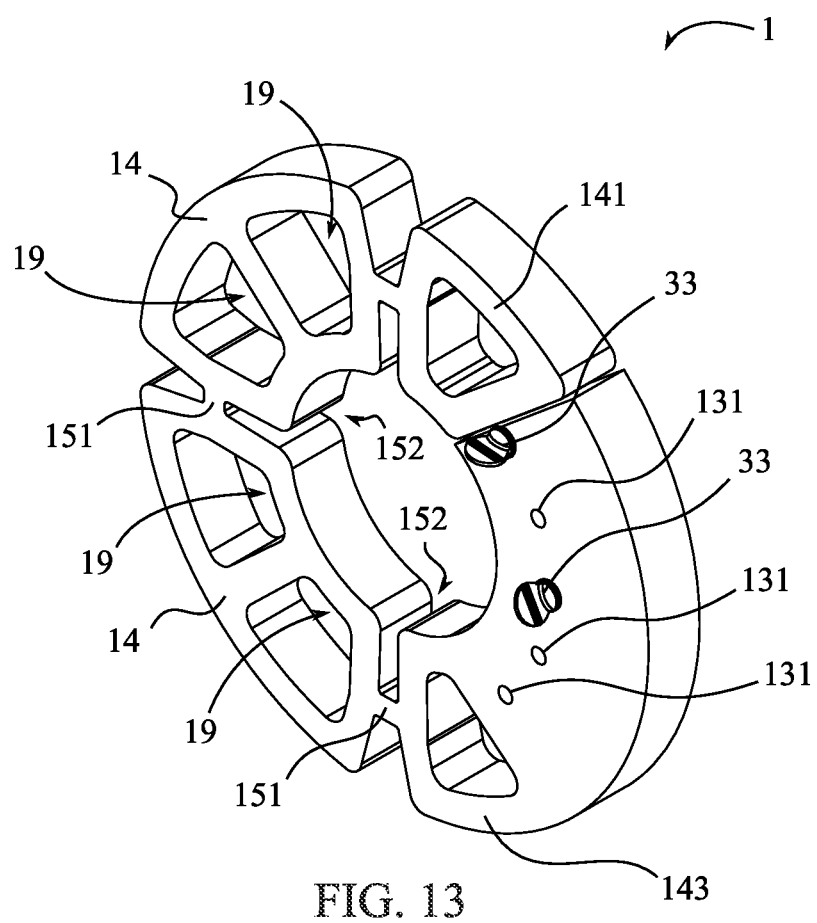
FIG. 13 is a rear perspective view in a closed position according to yet another alternative embodiment.
Figure 14:
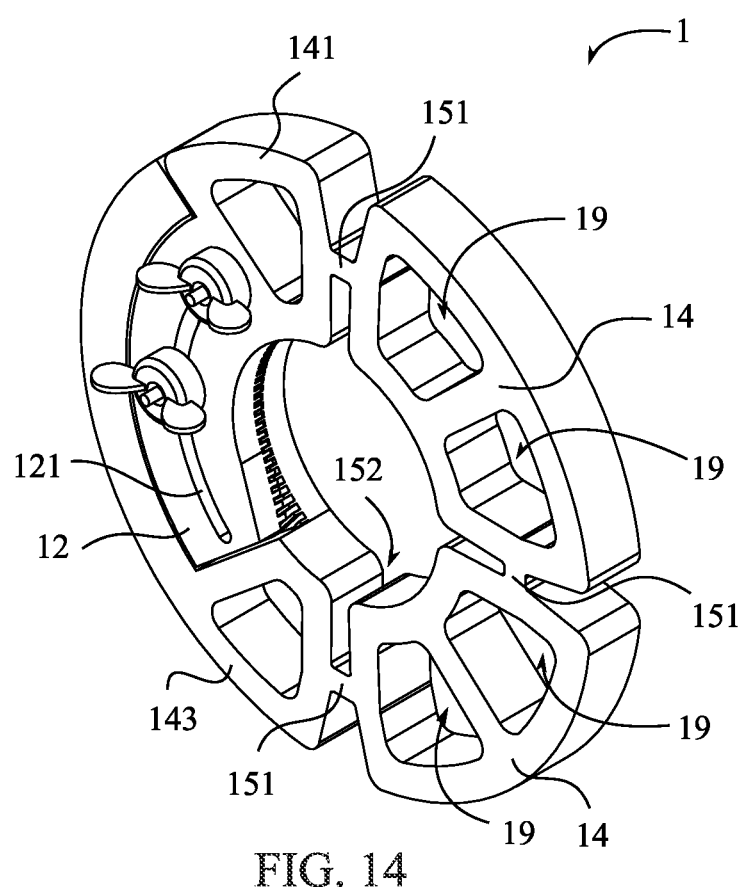
FIG. 14 is a front perspective view in a closed position according to yet another alternative embodiment.

In operation, the inner diameter of annular body 1 is adjusted by flexing the annular body 1 to a desired diameter and selecting one of the fastener holes 131. The first and second set of radially oriented ribs 1211, 1311 slidingly engage and catch on one another to prevent sliding from the selected inner diameter. The bolt 22 is then passed through the selected fastener hole 131 and secured by the nut 21, thus constraining the inner diameter of annular body 1. When the size adjustment slot 13 located on the second overlapping section 12 reaches to the $3^{rd}$ fastener hole or further on the first overlapping section 13 another bolt 22 is passed through the selected fastener hole 131 and secured by the nut 21. In some embodiments, alternative means of fastening are employed. For example the thumb screw bolt 33 can be used in place of the bolt 22, as shown in FIG. 13 and FIG. 14.

Figure 12:
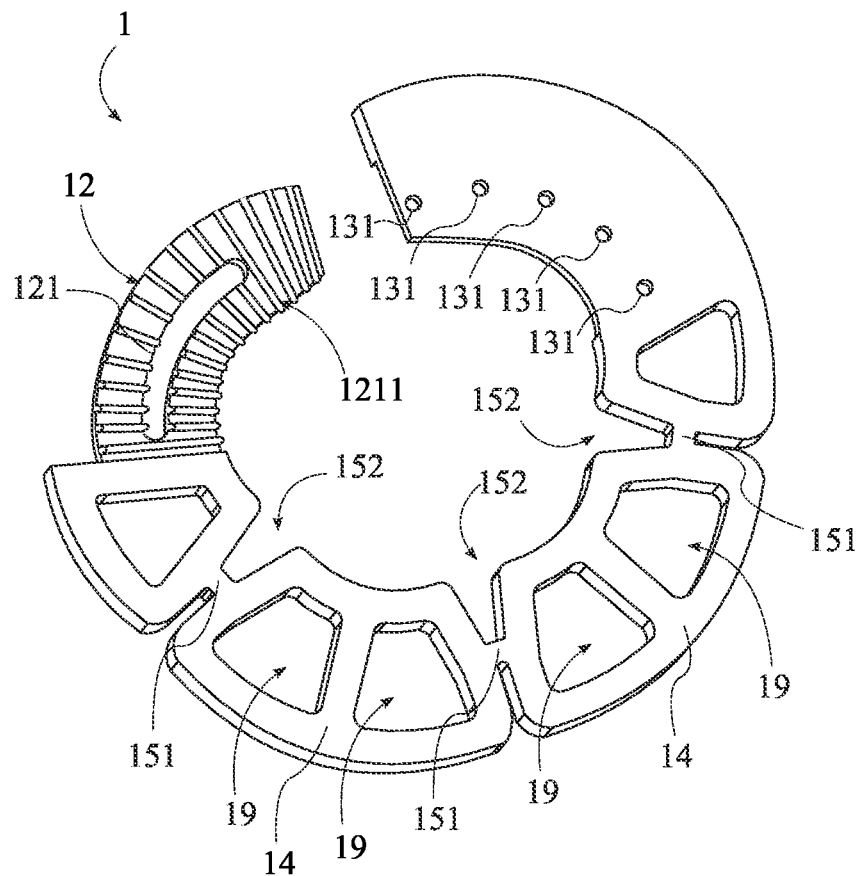
FIG. 12 is a rear perspective view in an open position in another alternative embodiment.

It should also be appreciated that the spirit and scope of the invention encompasses all possible combination of components. For example, the indent 122 can be omitted, as shown in FIG. 12.

Although the invention has been explained in relation to its preferred embodiment, it is to be understood that many other possible modifications and variations can be made without departing from the spirit and scope of the invention as hereinafter claimed.

What is claimed is:
1. An adjustable sanitary hose donut comprises:
an annular body;
a size adjustment slot extending through a first overlapping section of the annular body;
one or more fastener holes extending through a second overlapping section of the annular body;
the first overlapping section overlapping the second overlapping section.
the first overlapping section comprising a first group of raised ribs; and
the second overlapping section comprising a second group of raised ribs.
2. The adjustable sanitary hose donut as claimed in claim 1 comprises:
the annular body comprises a plurality of sectors, and a plurality of flex points;
each of the plurality of flex points comprises an elastic portion and an at least one open space;
the plurality of sectors and the plurality of flex points being radially positioned;
the plurality of flex points being alternated with the plurality of sectors;
a first and second portion positioned on opposite ends of the plurality of sectors;
the first portion adjacent to the first overlapping section;
the second portion adjacent to the second overlapping section; and
the at least one open space being positioned adjacent to the elastic portion.
3. The adjustable sanitary hose donut as claimed in claim 2 comprises:
each of the plurality of sectors comprises a grip opening.
4. The adjustable sanitary hose donut as claimed in claim 2 comprises:
a plurality of nuts;
a plurality of bolts, each comprising a head;
each of the bolts passing through the size adjustment slot and the one or more fastener holes; and
each of the nuts threadably engaged to the bolts.
5. The adjustable sanitary hose donut as claimed in claim 4 comprises:
an indent surrounding each of the fastener holes; and
each of the heads inserted into the indent.
6. The adjustable sanitary hose donut as claimed in claim 2 comprises:
the elastic portion of each of the plurality of flex points being connected to the plurality of sectors.
7. The adjustable sanitary hose donut as claimed in claim 1 comprises:
an arcuate ledge disposed on the second overlapping segment, the ledge adapted to guide the first overlapping section.
8. An adjustable sanitary hose donut comprises:
an annular body;
the annular body comprises a plurality of sectors and a plurality of flex points;
each of the plurality of flex points comprises an elastic portion and an at least one open space;
the plurality of sectors and the plurality of flex points being radially positioned;
the plurality of flex points being alternated with the plurality of sectors;
the at least one open space being positioned adjacent to the elastic portion;
a ledge;
the annular body further comprises a first overlapping section;
the first overlapping section comprises a size adjustment slot;
the size adjustment slot traverses through the first overlapping section;
the size adjustment slot is radially positioned along the first overlapping section;
the annular body further comprises a second overlapping section;
the second overlapping section comprises a plurality of fastener holes;
the ledge is adapted to guide the second overlapping section; and
the fastener holes traverse through the second overlapping section.
9. The adjustable sanitary hose donut as claimed in claim 8 comprises:
the adjustable sanitary hose donut further comprises a fastener;
the plurality of sectors comprises a first portion and a second portion;

the first overlapping section being adjacently connected to the first portion;

the second overlapping section being adjacently connected to the second portion; and the second overlapping section being attached to the first overlapping section by the fastener.

10. The adjustable sanitary hose donut as claimed in claim 8 comprises:

the adjustable sanitary hose donut further comprises a fastener;

the fastener comprises a nut and a bolt;

the bolt traversing through both the fastener hole and the size adjustment slot; and the nut threadably engaging the bolt, wherein the nut and the bolt clamp the first overlapping section and the second overlapping section together.

11. The adjustable sanitary hose donut as claimed in claim 8 comprises:

the adjustable sanitary hose donut further comprises a hanger;

the annular body further comprises a hanger receiver;

the hanger receiver laterally traversing into the plurality of sectors;

the hanger being attached to the plurality of sectors; and the hanger being positioned into the hanger receiver.

12. An adjustable sanitary hose donut comprises:

an annular body;

a fastener;

the annular body comprises a first overlapping section, a second overlapping section, a plurality of sectors, and a plurality of flex points;

the plurality of sectors comprises a first portion and a second portion;

each of the plurality of sectors comprises a grip opening;

each of the plurality of flex points comprises an elastic portion and an at least one open space;

the plurality of sectors and the plurality of flex points being radially positioned;

the plurality of flex points being alternated with the plurality of sectors;

the elastic portion of each of the plurality of flex points being connected to the plurality of sectors;

the at least one open space being positioned adjacent to the elastic portion;

the first overlapping section comprising a size adjustment slot, the first overlapping section being adjacently connected to the first portion;

the second overlapping section being adjacently connected to the second portion;

the second overlapping section being attached to the first overlapping section by the fastener;

the fastener comprises a plurality of nuts and a plurality of bolts;

the second overlapping section comprises a plurality of fastener holes;

the size adjustment slot traversing through the first overlapping section;

the plurality of fastener holes traversing through the second overlapping section;

the plurality bolts traversing through both the fastener hole and the size adjustment slot; and a plurality of nuts, each of the nuts being threadably engaging to each of the bolts.

13. The adjustment sanitary hose donut as claimed in claim 12 comprises:

the size adjustment slot being radially positioned along the first overlapping section;

the first overlapping section comprises a first group of raised ribs; and the second overlapping section comprises a second group of raised ribs.

* * * * *